United States Patent
Jung et al.

(10) Patent No.: US 8,877,542 B2
(45) Date of Patent: Nov. 4, 2014

(54) NANOSTRUCTURE ARRAY SUBSTRATE, METHOD FOR FABRICATING THE SAME AND DYE-SENSITIZED SOLAR CELL USING THE SAME

(75) Inventors: Gun Young Jung, Gwangju (KR); Hui Song, Gwangju (KR); Ki Seok Kim, Gwangju (KR)

(73) Assignee: Gwangju Institute of Science and Technology, Buk-Gu, Gwangju (KR)

( * ) Notice: Subject to any disclaimer, the term of this patent is extended or adjusted under 35 U.S.C. 154(b) by 200 days.

(21) Appl. No.: 13/325,505

(22) Filed: Dec. 14, 2011

(65) Prior Publication Data
US 2013/0019932 A1 Jan. 24, 2013

(30) Foreign Application Priority Data
Jul. 18, 2011 (KR) ......................... 10-2011-0070783

(51) Int. Cl.
H01L 31/18 (2006.01)
H01M 14/00 (2006.01)
H01G 9/20 (2006.01)

(52) U.S. Cl.
CPC ............ *H01M 14/005* (2013.01); *Y02E 10/542* (2013.01); *H01G 9/2036* (2013.01); *H01G 9/204* (2013.01); *H01G 9/2031* (2013.01)
USPC ................................ 438/85; 136/265; 117/58

(58) Field of Classification Search
USPC .............. 438/85, 89, 93; 136/265; 117/58, 68
See application file for complete search history.

(56) References Cited

U.S. PATENT DOCUMENTS

| | | | | |
|---|---|---|---|---|
| 7,545,010 B2 * | 6/2009 | Ichihara et al. | ............... | 257/414 |
| 8,063,450 B2 * | 11/2011 | Wernersson et al. | ......... | 257/392 |
| 8,067,763 B2 * | 11/2011 | Wang et al. | ..................... | 257/40 |
| 8,089,063 B2 * | 1/2012 | Zheng et al. | ................... | 257/40 |
| 8,106,388 B2 * | 1/2012 | Zheng et al. | ................... | 257/40 |
| 8,148,632 B2 * | 4/2012 | Serban et al. | ................. | 136/263 |
| 8,227,686 B2 * | 7/2012 | Serban et al. | ................. | 136/256 |
| 8,269,100 B2 * | 9/2012 | Darling et al. | ................ | 136/263 |
| 8,283,561 B2 * | 10/2012 | Serban et al. | ................. | 136/263 |
| 8,288,649 B2 * | 10/2012 | Serban et al. | ................. | 136/263 |
| 8,299,355 B2 * | 10/2012 | Serban et al. | ................. | 136/263 |
| 8,367,435 B2 * | 2/2013 | Chow et al. | ..................... | 438/22 |
| 8,367,462 B2 * | 2/2013 | Wang et al. | ................... | 438/104 |

(Continued)

OTHER PUBLICATIONS

Priya et al., LbL Fabricated Poly(Styrene Sulfonate)/TiO2 Multilayer Thin Films for Environmental Applications, Applied Materials & Interfaces, vol. 1, No. 11, 2009, pp. 2684-2693.*

*Primary Examiner* — Earl Taylor
(74) *Attorney, Agent, or Firm* — Nath, Goldberg & Meyer; Joshua B. Goldberg; Scott H. Blackman

(57) ABSTRACT

Disclosed are a nanostructure array substrate, a method for fabricating the same, and a dye-sensitized solar cell by using the same. The nanostructure array substrate includes a plurality of metal oxide nanostructures vertically aligned on the substrate while being separated from each other. The metal oxide nanostructures include nanorods having a ZnO core/ $TiO_2$ shell structure or $TiO_2$ nanotubes. The method includes the steps of forming ZnO nanorods vertically aligned from a seed layer formed on a substrate; and coating a $TiO_2$ sol on the ZnO nanorods and sintering the ZnO nanorods to form nanorods having a ZnO core/$TiO_2$ shell structure. The transparency and flexibility of the substrate are ensured. The photoelectric conversion efficiency of the solar cell is improved if the nanostructure array substrate is employed in the photo electrode of the dye-sensitized solar cell.

10 Claims, 12 Drawing Sheets

(56) References Cited

U.S. PATENT DOCUMENTS

| | | | |
|---|---|---|---|
| 8,372,678 B2 * | 2/2013 | Zhao et al. | 438/57 |
| 8,373,063 B2 * | 2/2013 | Serban et al. | 136/263 |
| 8,394,663 B2 * | 3/2013 | Harris et al. | 438/94 |
| 8,426,728 B2 * | 4/2013 | Zhao et al. | 136/264 |
| 8,455,757 B2 * | 6/2013 | Wang et al. | 136/263 |
| 2005/0062033 A1 * | 3/2005 | Ichihara et al. | 257/17 |
| 2008/0041446 A1 * | 2/2008 | Wu et al. | 136/263 |
| 2008/0149944 A1 * | 6/2008 | Samuelson et al. | 257/88 |
| 2010/0078066 A1 * | 4/2010 | Darling et al. | 136/256 |
| 2010/0176459 A1 * | 7/2010 | Wernersson et al. | 257/392 |
| 2010/0275985 A1 * | 11/2010 | Zheng et al. | 136/256 |
| 2011/0247548 A1 * | 10/2011 | Jung et al. | 117/58 |
| 2011/0309354 A1 * | 12/2011 | Wang et al. | 257/43 |
| 2012/0132930 A1 * | 5/2012 | Young et al. | 257/84 |
| 2013/0019932 A1 * | 1/2013 | Jung et al. | 136/255 |

* cited by examiner

NANOSTRUCTURE ARRAY SUBSTRATE, METHOD FOR FABRICATING THE SAME AND DYE-SENSITIZED SOLAR CELL USING THE SAME

CROSS-REFERENCE TO RELATED APPLICATION

This application claims the benefit under 35 U.S.C. §119 of Korean Patent Application No. 10-2011-0070783, filed on Jul. 18, 2011 in the Korean Intellectual Property Office, the entirety of which is incorporated herein by reference.

BACKGROUND OF THE INVENTION

1. Field of the Invention

The present invention relates generally to a nanostructure array substrate, a method for fabricating the same, and an application of the same. More particularly, the present invention relates to a metal oxide nanostructure array substrate, a method for fabricating the same, and a dye-sensitized solar cell using the same.

2. Description of the Related Art

The one-dimensional structures having a nano-scale, such as nanorods or nanowires, have inherent optical and electric characteristics, so the one-dimensional structures have been used for various electronic devices and optical devices.

Korean Unexamined Patent Publication No. 2010-00869592, which has been filed by some of inventers of the present invention, discloses ZnO rods vertically aligned on a substrate while being separated from each other and a method for fabricating the same. A well-aligned nanostructure array having the vertical alignment on the substrate can be formed by using the ZnO rods.

Recently, as the environmental pollution and high-price oil have been issued, development of clean alternative energy has been interested, so various studies and research have been pursued to develop solar cells. Among the solar cells, a dye-sensitized solar cell generally consists of a photo electrode including photosensitive dyes adsorbed in a transparent substrate and a porous oxide nano-particle, an iodine-based electrolyte prepared by dissolving iodine ions undergoing oxidation/reduction reaction in an organic solvent, and a Pt counter electrode. The dye-sensitized solar cell is inexpensive and can be fabricated through a simple process as compared with a conventional silicon solar cell. However, the photoelectric conversion efficiency of the dye-sensitized solar cell is very low, so there are limitations to use the dye-sensitized solar cell in practice.

In order to improve the photoelectric conversion efficiency of the dye-sensitized solar cell, various studies and research have been performed. For instance, there have been suggested methods for increasing adsorption of solar light, increasing generation of electrons by increasing adsorption of dyes, preventing extinction of excited electrons caused by recombination of electrons and holes, and improving mobility of electrons.

Among them, Korean Unexamined Patent Publication No. 2010-0137032 discloses a method for improving a dye adsorption area and mobility of electrons by preparing titanium oxide used in a photo electrode of a dye-sensitized solar cell as a nano-branch, other than porous nano-particles. However, according to the above method, the nano-branch is not vertically aligned on a substrate, but laterally aligned on the substrate and thickness of the electrode is increased at a dye adsorption surface, so the transparency of the substrate may be degraded.

In addition, Korean Unexamined Patent Publication No. 2010-0075032 discloses a method for fabricating a self-aligned titanium nanotube, and Korean Unexamined Patent Publication Nos. 2010-0121116, 2009-0022956 and 2009-0035343 disclose a titanium nanotube and a dye-sensitized solar cell using the same. However, the titanium nanotubes disclosed in the above publications are fabricated through an etching process using the anodizing. The titanium structure referred to as the nanotube may have the porous shape, in which a plurality of holes having a cylinder shape are formed in a titanium substrate. That is, the nanotubes disclosed in the above publications may not be separated from each other, but laterally connected with each other. In this case, the surface area of the titanium oxide to which the dyes are adsorbed may not be greatly increased. In addition, if the titanium nanotubes fabricated through the above methods are applied to a photo electrode of a dye-sensitized solar cell, the transparency of the photo electrode may be degraded, and the light adsorption may be reduced.

That is, there are limitations to improve the photoelectric conversion efficiency of the solar cell by using the conventional technologies, so a new technology is necessary to improve the photoelectric conversion efficiency of the solar cell.

References:
1) KR 2010-0086592 A
2) KR 2010-0137032 A
3) KR 2010-0075032 A
4) KR 2010-0121116 A
5) KR 2009-0022956 A
6) KR 2009-0035343 A

SUMMARY OF THE INVENTION

Accordingly, the present invention has been made keeping in mind the above problems occurring in the prior art, and an object of the present invention is to provide a nanostructure array substrate applicable for various electronic devices and optical devices and a method for fabricating the same.

Another object of the present invention is to provide a dye-sensitized solar cell using the nanostructure array substrate.

To accomplish the above objects, according to one aspect of the present invention, there is provided a nanostructure array substrate.

The nanostructure array substrate includes a plurality of metal oxide nanostructures vertically aligned on the substrate while being separated from each other. The metal oxide nanostructures include nanorods having a ZnO core/$TiO_2$ shell structure or $TiO_2$ nanotubes.

To accomplish the above objects, according to another aspect of the present invention, there is provided a method for fabricating a nanostructure array substrate.

The method according to one embodiment of the present invention includes the steps of forming a ZnO seed layer on a substrate; forming a pattern layer having a plurality of holes in the ZnO seed layer such that the ZnO seed layer is partially exposed through the pattern layer; forming ZnO nanorods vertically aligned from the exposed seed layer; removing the pattern layer; and coating a $TiO_2$ sol on the ZnO nanorods and sintering the ZnO nanorods to form nanorods having a ZnO core/$TiO_2$ shell structure.

The method according to another embodiment of the present invention includes the steps of forming a ZnO seed layer patterned in a form of dots on a substrate; forming ZnO nanorods vertically aligned from the ZnO seed layer; and coating a TiO$_2$ sol on the ZnO nanorods and sintering the ZnO nanorods to form nanorods having a ZnO core/TiO$_2$ shell structure.

The method further includes a step of forming TiO$_2$ nanotubes by etching upper end portions of TiO$_2$ shells and ZnO cores after forming the nanorods having the core/shell structure.

To accomplish the above objects, according to still another aspect of the present invention, there is provided a dye-sensitized solar cell.

The dye-sensitized solar cell includes a photo electrode; a counter electrode opposite to the photo electrode; and an electrolyte interposed between the photo electrode and the counter electrode. The photo electrode includes a transparent conductive substrate; a plurality of metal oxide nanostructures vertically aligned on the substrate while being separated from each other; and a dye adsorbed in the metal oxide nanostructures. The metal oxide nanostructures include nanorods having a ZnO core/TiO$_2$ shell structure or TiO$_2$ nanotubes.

To accomplish the above objects, according to still another aspect of the present invention, there is provided a method for fabricating a photo electrode of a dye-sensitized sol cell.

The method includes the steps of fabricating a nanostructure array substrate according to the method for fabricating the nanostructure array substrate, and adsorbing dyes in nanorods having a ZnO core/TiO$_2$ shell structure or TiO$_2$ nanotubes included in the nanostructure array substrate.

As described above, according to the present invention, the nanostructures are vertically aligned on the substrate while being separated from each other, so the transparency of the substrate can be ensured. In addition, the nanostructures may not collide with each other even if the substrate is bent, so a flexible substrate can be employed and flexibility of devices can be effectively ensured.

In addition, the dye-sensitized solar cell including the nanostructure array substrate according to the present invention can shorten the movement route of the electrons when comparing with the conventional dye-sensitized solar cell including a porous layer consisting of TiO$_2$ particles used in a photo electrode. In particular, if nanorods having the ZnO core/TiO$_2$ shell structure are used as the nanostructures, electrons generated as the dyes adsorb the light can be easily collected in a negative electrode through conduction bands of TiO$_2$ shell and the ZnO core.

Further, if TiO$_2$ nanotubes are used for the nanostructures, the dyes can be adsorbed in both inner and outer peripheral surfaces of the nanotubes, so the dye adsorption can be increased. In addition, open circuit voltage and photoelectric current of the dye-sensitized solar cell can be increased, so the photoelectric conversion efficiency can be improved.

The effects of the present invention may not be limited to the above effects, and other effects of the present invention may be comprehended to those skilled in the art from the following description.

DETAILED DESCRIPTION OF THE INVENTION

Figure 1:
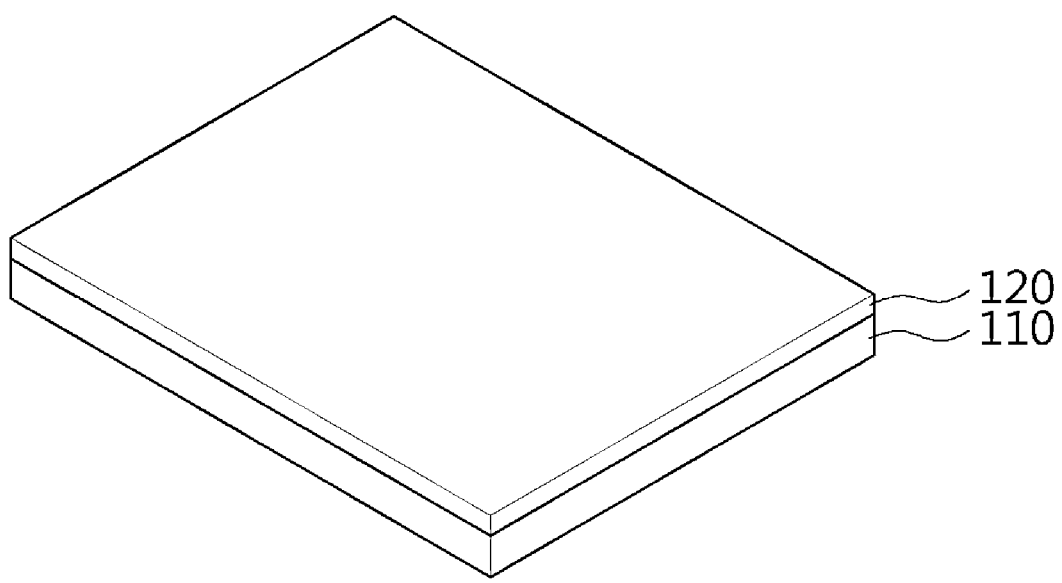
FIGS. 1 to 6 are perspective and sectional views for explaining a method for fabricating a nanostructure array substrate according to one embodiment of the present invention.

Hereinafter, exemplary embodiments of the present invention will be described with reference to accompanying drawings. The present invention is not limited to the following embodiments, but can be embodied in various forms. The embodiments will make the disclosure of the present invention complete, and allow those skilled in the art to completely comprehend the scope of the present invention. The thickness of layers and regions in the drawings may be exaggerated for the purpose of clarity. If it is determined that description about well known functions or configurations may make the subject matter of the present invention unclear, the details thereof will be omitted.

<Embodiment 1: Fabrication of Nanostructure Array Substrate>

Fabrication of Nanorod Array Substrate Having Core/Shell Structure

According to one embodiment of the present invention, a method for fabricating a nanostructure array substrate is provided. The method includes the steps of forming a ZnO seed layer on a substrate; forming a pattern layer having a plurality of holes in the ZnO seed layer such that the ZnO seed layer is partially exposed through the pattern layer; forming ZnO nanorods vertically aligned from the exposed seed layer; removing the pattern layer; and coating a TiO$_2$ sol on the ZnO nanorods and sintering the ZnO nanorods to form nanorods having a ZnO core/TiO$_2$ shell structure.

FIGS. 1 to 6 are perspective views (FIGS. 1 to 4 and 6) and a sectional view (FIG. 5) for explaining the method for fabricating the nanostructure array substrate 100 according to one embodiment of the present invention.

Referring to FIG. 1, a ZnO seed layer 120 is formed on a substrate 110.

The various types of substrates can be employed as the substrate 110 if a nanostructure array can be formed thereon. In addition, the substrate 110 may be an organic substrate or an inorganic substrate. Further, the substrate 110 may be formed by stacking at least two homogeneous or heterogeneous organic/inorganic substances. For instance, the substrate 110 may include a glass substrate, a sapphire substrate, a silicon substrate, a metal substrate, a metal oxide substrate (for instance, ITO, FTO or ZnO substrate), a GaN substrate, an SiC substrate, a GaAs substrate, an InP substrate, an MN substrate, a PET (polyethylene terephthalate) substrate, a PC (polycarbonate) substrate, a PES (polyether sulfone) substrate, a PI (polyimide) substrate, a polynorbonene substrate, a PEN (Polyethylene Naphthalate) substrate, and a substrate formed by stacking at least two of the above.

The substrate 110 may be properly selected according to the type and function of a device to which the substrate 110 is applied.

The ZnO seed layer 120 may include ZnO particles having a predetermined size and can be formed through various methods.

For instance, the ZnO seed layer 120 may be formed through a sol-gel method. In this case, a sol precursor solution containing zinc salt is heated into a sol state and a surfactant is added to the sol to prepare a solution to form a seed layer. Then, the solution is coated on the substrate 110 and heated into a gel state, thereby forming the ZnO seed layer 120. The solution can be coated through various methods, such as spin coating, dip coating, doctor blade, spray coating, and screen printing.

The zinc salt may include zinc acetate, zinc nitrate, zinc sulfate or zinc chloride, and the solvent may include a polar solvent, such as ethanol. The surfactant is added to reduce the reaction speed and to increase viscosity in the sol state and may include a PEG (polyethylene glycol) based surfactant, such as Triton x-100, or HPC (Hydroxypropyl cellulose).

The ZnO seed layer 120 has the alignment in the C-axis direction under the gel state. That is, ZnO particles prepared to enter the sol state represent the crystalline property growing in the C-axis direction when they are heated after they are coated on the substrate 110. This is because the crystal structure of ZnO has the inherent characteristics. In detail, ZnO crystal represents the high growth rate in the [0001] direction, and the low growth rate in the lateral direction. In addition, polarization of ZnO occurs in a [0001] plane, but there is no polarization at the lateral sides. Thus, when the heat treatment process is performed after the solution to form the seed layer has been coated, the ZnO seed layer 120 has the crystalline property growing in the direction perpendicular to the lower substrate 110.

In addition, the ZnO seed layer 120 can be formed through the hydrothermal synthesis.

In this case, the ZnO seed layer 120 may be formed by using a seed culture solution including a Zn ion donor, an OH ion donor and a solvent.

The Zn ion donor may include Zn salt, such as Zinc acetate, Zinc nitrate, Zinc sulfate, or Zinc chloride. The OH ion donor may include NaOH, $Na_2CO_3$, LiOH, $H_2O_2$, KOH, HMTA (hexamethylenetetramine) or $NH_4OH$. The solvent preferably includes a polar solvent. The solvent may include water, alcohol or an organic solvent. Preferably, the polar solvent may include both water and alcohol.

The reaction to form the ZnO seed layer 120 through the hydrothermal synthesis may be expressed as following formulas 1 to 4.

$$Zn^{2+}+2OH^- \rightarrow ZnO+H_2O \quad \text{[Formula 1]}$$

$$Zn^{2+}+2OH^- \leftrightarrow Zn(OH)_2 \quad \text{[Formula 2]}$$

$$Zn(OH)_2+2OH^- \rightarrow Zn(OH)_4^{2-} \quad \text{[Formula 3]}$$

$$Zn(OH)_4^{2-} \rightarrow ZnO+H_2O+2OH^- \quad \text{[Formula 4]}$$

Referring to above formulas, $Zn^{2+}$ supplied from the Zn ion donor reacts with $OH^-$ supplied from the OH ion donor to form the ZnO (formula 1) or to form an intermediate $Zn(OH)_2$ (formula 2). In addition, the intermediate $Zn(OH)_2$ reacts with $OH^-$ to form a ZnO growth factor $Zn(OH)_4^{2-}$ (formula 3), so that ZnO is finally formed (formula 4).

In addition, in order to adjust the size of the ZnO particles, an overgrowth inhibitor may be added to the seed culture solution containing the ZnO particles. Preferably, the overgrowth inhibitor includes cationic polymer. In detail, the cationic polymer includes an amine group and may be a PEI (polyethyleneimine)-based material having superior solubility in the polar solvent. The ZnO growth factor $Zn(OH)_4^{2-}$ is bonded with cations of the cationic polymer to prevent the cations from participating in the growth of ZnO. Thus, the size of the ZnO particles can be adjusted by using the overgrowth inhibitor.

Then, the ZnO particles are separated from each other and the separated ZnO particles are distributed in the solvent. After that, the solution process, such as spin coating, is performed to form the ZnO seed layer 120.

In addition to the above methods, various physical or chemical deposition methods, such as evaporation, MOCVD or sputtering, can be performed to form the ZnO seed layer 120.

Figure 2:
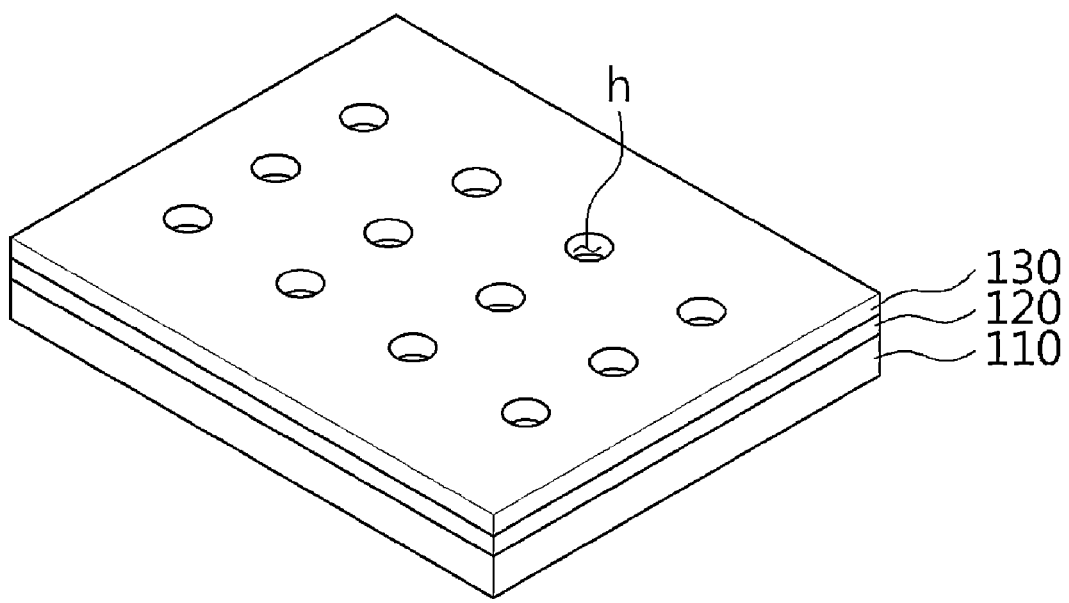

Referring to FIG. 2, after the ZnO seed layer 120 has been formed, a pattern layer 130 having a plurality of holes h is formed on the ZnO seed layer 120. For instance, the pattern layer 130 may include a photoresist pattern. In this case, after a photoresist layer has been formed on the ZnO seed layer 120, hole patterns having various sizes can be formed through various patterning technologies, such as laser interference lithography, nano-imprint lithography, E-beam lithography, UV lithography, holographic lithography, or immersion lithography. Thus, the ZnO seed layer 120 is partially exposed through the holes h formed in the pattern layer 130.

Figure 3:
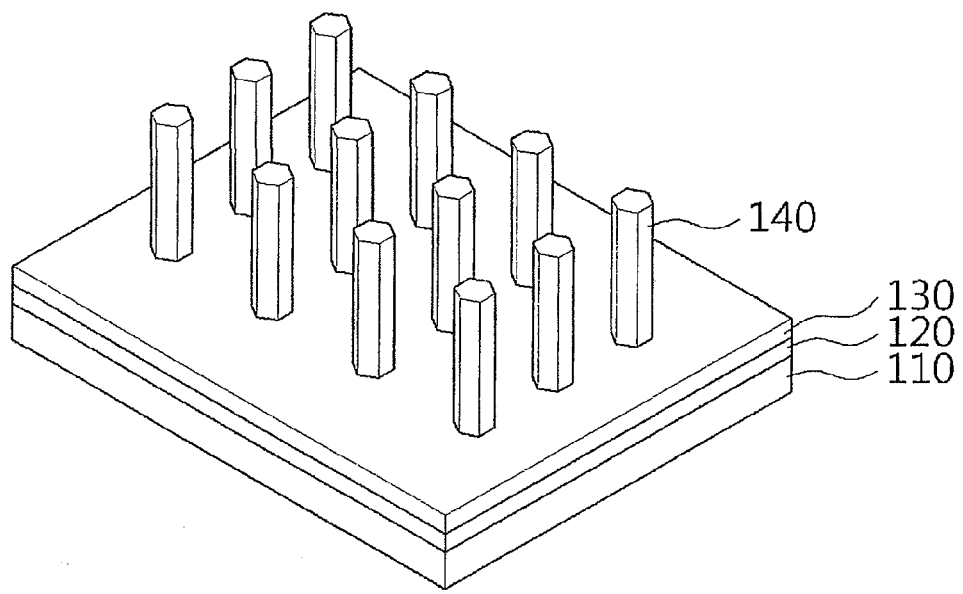
Figure 3A:
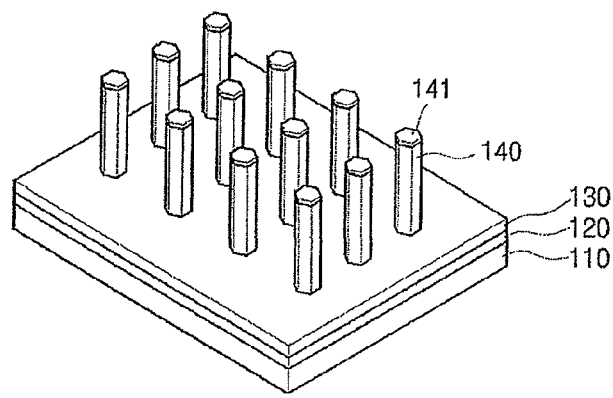

Referring to FIG. 3, crystalline ZnO nanorods 140 are grown from the holes h formed in the pattern layer 130. That is, the ZnO nanorods 140 are formed from the exposed ZnO seed layer 120 through the holes h formed in the pattern layer 130. At this time, the crystal growth may not proceed in the seed layer 120 occluded by the pattern layer 130. That is, the crystal growth is generated in the hole region open by the pattern layer 130, so that the ZnO nanorods 140 are separated from each other through the hole pattern.

The ZnO nanorods 140 are grown through the expansion of the crystalline property from the ZnO seed layer 120 and vertically aligned on the substrate 110.

The ZnO nanorods 140 can be formed through the hydrothermal synthesis by using a culture solution including a Zn ion donor, an OH ion donor and an overgrowth inhibitor. The overgrowth inhibitor may be omitted if necessary.

The Zn ion donor, the OH ion donor and the overgrowth inhibitor have already been described in the process for forming the ZnO seed layer 120. For instance, if Zn nitrate is used as the Zn ion donor, and $HTMA(C_6H_{12}N_4)$ is used as the OH ion donor, the ZnO nanorods 140 can be formed through following formulas 5 to 10.

$$C_6H_{12}N_4+6H_2 \leftrightarrow 6CH_2O+4NH_3 \quad \text{[Formula 5]}$$

$$NH_3+H_2O \leftrightarrow NH_4^++OH^- \quad \text{[Formula 6]}$$

$$Zn(NO_3)_2 \rightarrow Zn^{2+}+2NO_3^- \quad \text{[Formula 7]}$$

The $HTMA(C_6H_{12}N_4)$ provides $NH_4^+$ and $OH^-$ through formulas 5 and 6, and $Zn(NO_3)_2$ provides Zn ions through formula 7.

The $NH_3$, $OH^-$ and $Zn^{2+}$ generated through formulas 5 to 7 may create $Zn(NH^3)_4^{2+}$ and $Zn(OH)_4^{2-}$, which are the growth factor of the ZnO nanorods 140, through formulas 8 and 9.

$$Zn^{2+}+4NH_3 \rightarrow Zn(NH_3)_4^{2+} \quad \text{[Formula 8]}$$

$$Zn^{2+}+4OH^- \rightarrow Zn(OH)_4^{2-} \quad \text{[Formula 9]}$$

The $Zn(NH_3)_4^{2+}$ created through formula 8 reacts with $OH^-$, which is a reaction factor, through following formula 10, so that the crystalline ZnO nanorods 140 can be formed. In addition, the $Zn(OH)_4^{2-}$ created through the formula 9 can form the crystalline ZnO nanorods 140 through following formula 11.

$Zn(NH_3)_4^{2+} + 2OH^- \rightarrow ZnO + 4NH_3 + H_2O$ [Formula 10]

$Zn(OH)_4^{2-} \rightarrow ZnO + H_2O + 2OH^-$ [Formula 11]

At this time, if the cationic polymer, which is the overgrowth inhibitor, is added to the culture solution, the cationic polymer adsorbs the $Zn(OH)_4^{2-}$ serving as the growth factor, so the $Zn(OH)_4^{2-}$ may not participate in the growth of the ZnO nanorods 140. The $Zn(OH)_4^{2-}$ is generally known as the growth factor for growing ZnO in the form of a spread rod bundle. In addition, the cationic polymer may interrupt the lateral growth through the interaction with anionic $O^{2-}$ exposed to the lateral sides of the ZnO crystal structure. That is, the cationic polymer is accumulated around the ZnO nanorods, so that the lateral growth of the ZnO nanorods is interrupted by the cationic polymer. As a result, the ZnO nanorods 140 are mainly grown in the C-axis direction and vertically aligned on the substrate 110 substantially.

Figure 4:
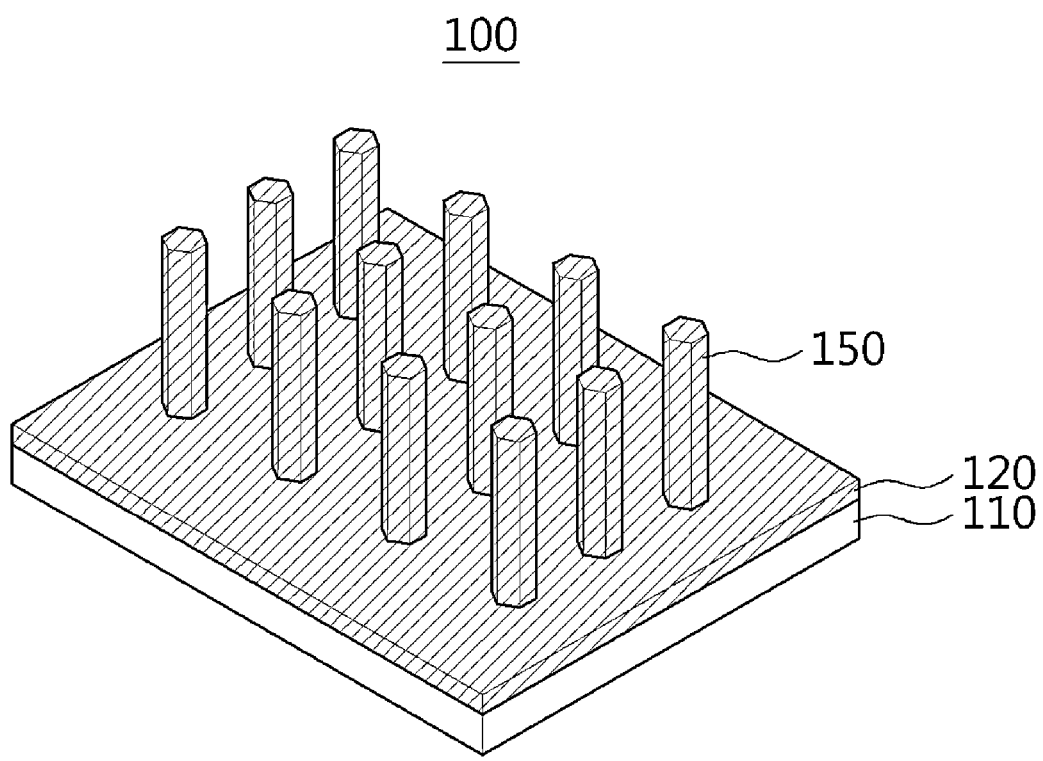
Figure 5:
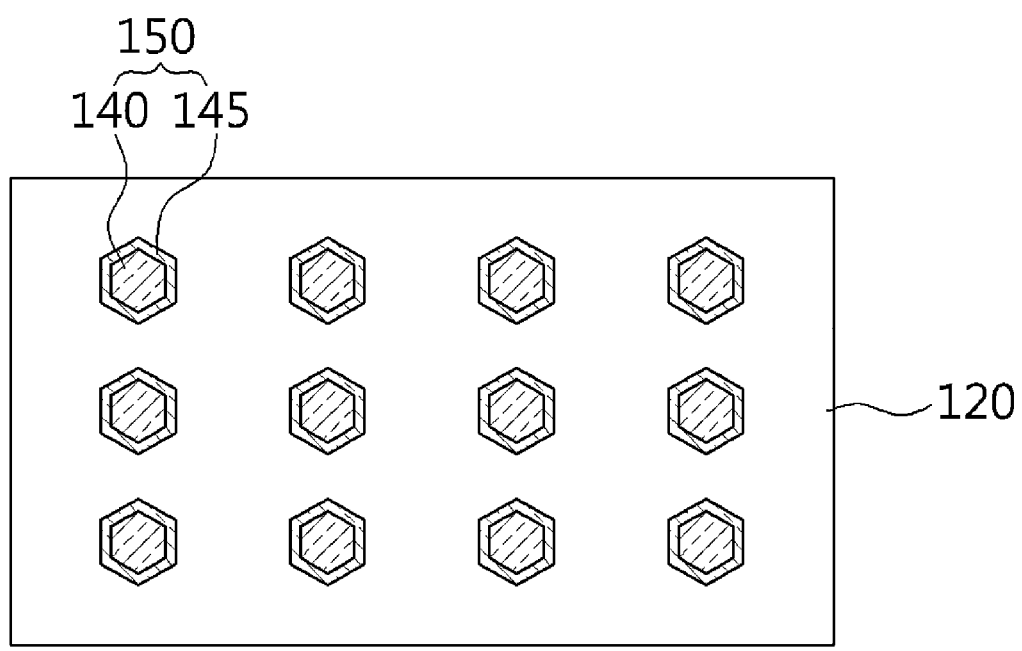

Referring to FIG. 4, after the pattern layer 130 has been removed, a $TiO_2$ sol is coated on the ZnO nanorods 140 and sintered thereon, so that nanorods 150 having the ZnO core/$TiO_2$ shell structure are formed. FIG. 5 is a longitudinal sectional view of the nanorods 150 having the ZnO core/$TiO_2$ shell structure shown in FIG. 4. Referring to FIG. 5, ZnO cores 140 are surrounded by $TiO_2$ shells 145, respectively.

The pattern layer 130 can be removed through various etching schemes. For instance, the pattern layer 130 can be removed through the dry etching by using $O_2$ plasma.

Meanwhile, although only the pattern layer 130 has been removed in FIG. 4, the ZnO seed layer 120 located under the pattern layer 130 may be selectively removed if necessary after the ZnO nanorods 140 have been formed. The ZnO seed layer 120 can be removed through various etching schemes. For instance, the ZnO seed layer 120 can be removed through the dry etching by using Ar plasma.

The $TiO_2$ sol may include an organic solvent, such as titanium alkoxide or alcohol. For instance, the titanium alkoxide may include titanium butoxide, and the alcohol may include isopropyl alcohol (IPA).

The $TiO_2$ sol may be formed by heat-treating a solution containing the titanium alkoxide and the organic solvent in a predetermined temperature. In order to adjust the viscosity of the sol solution, dispersion liquid, such as alcohol, chloroform, chlorobenzene, difluorobenzene, THF, xylene, DMF, DMSO or toluene, can be further added.

The $TiO_2$ sol may be coated on the ZnO nanorods 140 through various coating schemes. Preferably, the drop casting scheme can be employed to drop droplets of the $TiO_2$ sol onto the ZnO nanorods 140.

After that, the $TiO_2$ sol is sintered so that the $TiO_2$ shells 145 surrounding the ZnO nanorods 140 can be formed. That is, when the $TiO_2$ shells 145 are formed, the ZnO nanorods 140 may serve as a template. In this case, since the ZnO nanorods 140 have the distinct crystalline property, the $TiO_2$ sol may be formed as an anatase type having superior stability through the sintering process due to the crystalline property of the ZnO nanorods 140.

Meanwhile, before the $TiO_2$ sol has been coated on the ZnO nanorods 140, a step of capping upper end portions of the ZnO nanorods 140 with anionic organic substances 141 can be performed. In this case, a part of $TiO_2$ located at the upper end portions of the ZnO nanorods 140 can be easily etched in the process of forming $TiO_2$ nanotubes, which will be described later. For instance, the anionic organic substances may include citrate ions. In this case, the substrate 100 formed with the ZnO nanorods 140 is immersed in sodium citrate for chemically capping the upper end portions of the ZnO nanorods 140.

Fabrication of Nanotube Array Substrate

The method for fabricating the nanostructure array substrate according to the embodiment of the present invention may include a step of forming $TiO_2$ nanotubes by etching upper end portions of the $TiO_2$ shells and the ZnO cores after fabricating the nanostructure array substrate including the nanorods having the ZnO core/$TiO_2$ shell structure through the above method.

Figure 6:
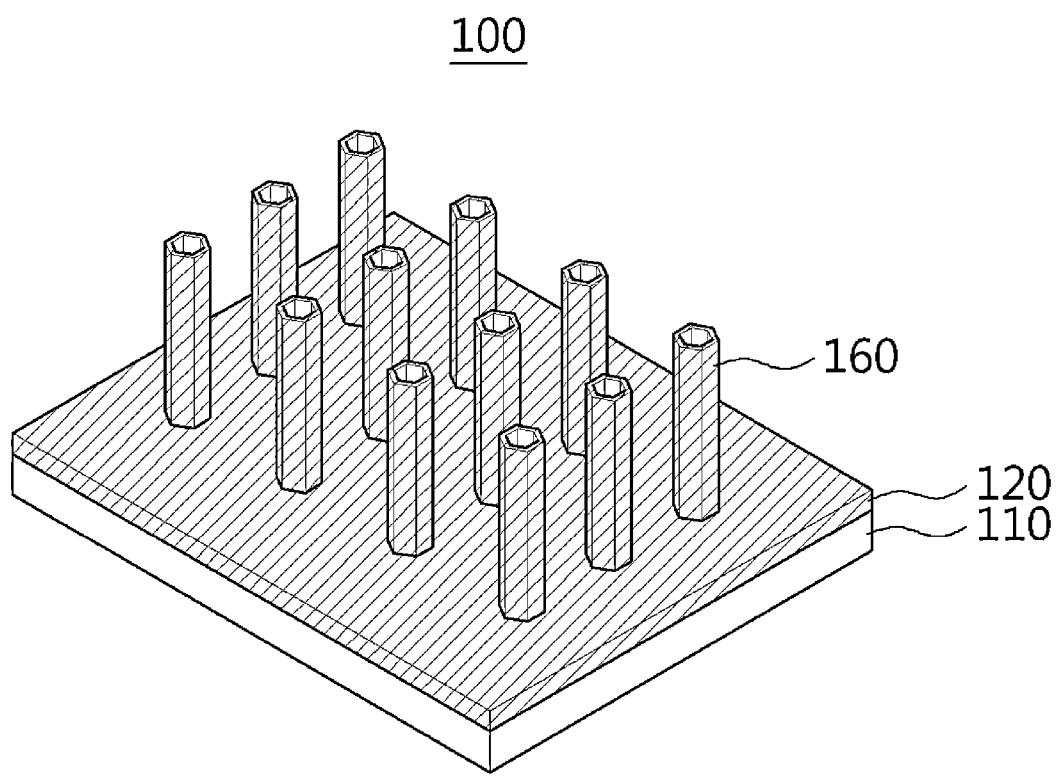

FIG. 6 is a perspective view showing the $TiO_2$ nanotubes vertically aligned on the substrate.

As shown in FIG. 6, the $TiO_2$ nanotubes 160 can be formed by etching end upper portions of the $TiO_2$ shells and the ZnO cores of the nanorods 150 having the ZnO core/$TiO_2$ shell structure shown in FIG. 4.

The upper end portions of the $TiO_2$ shells can be etched through the dry etching scheme by using plasma. For instance, the substrate 110 formed thereon with the nanorods 150 having the ZnO core/$TiO_2$ shell structure is loaded in a plasma chamber and Ar plasma is irradiated onto the substrate 110 to etch the upper end portions of the $TiO_2$ shells. Meanwhile, in the process of coating and sintering the $TiO_2$ sol, a $TiO_2$ layer can be deposited on the substrate 110 (or on the ZnO seed layer 120 if the ZnO seed layer 120 is not removed) as well as the $TiO_2$ shells surrounding the ZnO nanorods. The $TiO_2$ layer may be selectively removed according to the type of devices to which the nanostructure array substrate is applied. The $TiO_2$ layer can be removed through various schemes. As described above, if the upper end portions are etched by using Ar plasma, the $TiO_2$ layer is also simultaneously etched by the Ar plasma vertically irradiated onto the substrate 110.

In addition, the ZnO cores can be etched through the wet etching scheme. Further, ZnO may be removed through the dissolution mechanism by acid, alkali, or chloride ions. Especially, since hydrogen ions generated from an acid solution have the smallest ion radius, the hydrogen ions may readily penetrate between the crystal lattices of the $TiO_2$ shells. In addition, $TiO_2$ may have a strong acid-resistant property. Thus, if the acid solution, such as HCl, is used, the ZnO cores can be effectively removed without causing damage to the $TiO_2$ shells.

Meanwhile, as described above, if the upper end portions of the ZnO nanorods are capped with cationic organic substances before the $TiO_2$ sol is coated, the upper end portions of the $TiO_2$ shells can be readily etched, so the $TiO_2$ nanotubes can be formed under the more generous conditions.

<Embodiment 2: Fabrication of Nanostructure Array Substrate>

According to one embodiment of the present invention, the nanostructure array substrate is fabricated through the steps of forming a ZnO seed layer patterned in a form of dots on a substrate; forming ZnO nanorods vertically aligned from the ZnO seed layer; and coating a $TiO_2$ sol on the ZnO nanorods and sintering the ZnO nanorods to form nanorods having a ZnO core/$TiO_2$ shell structure.

According to the present embodiment, different from Embodiment 1, the ZnO seed layer is patterned in the form of dots. That is, the ZnO seed layer is aligned on the substrate in the form of dots spaced apart from each other by a predetermined interval. The ZnO seed layer patterned in the form of dots can be obtained through various schemes.

Figure 7:
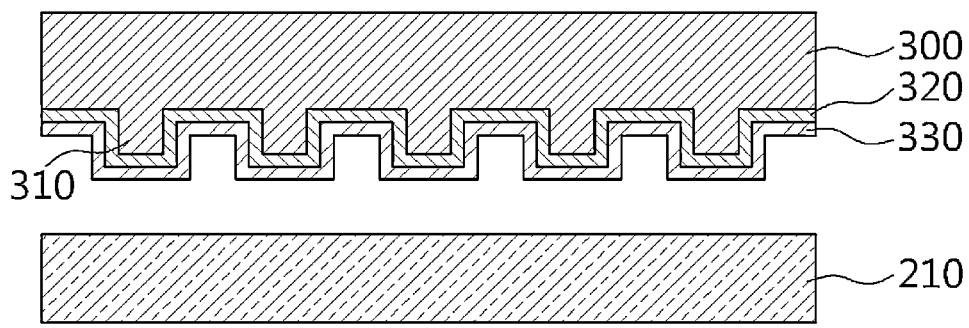
FIGS. 7 to 9 are sectional views showing an example of forming a ZnO seed layer patterned in the form of dots on a substrate.
Figure 8:
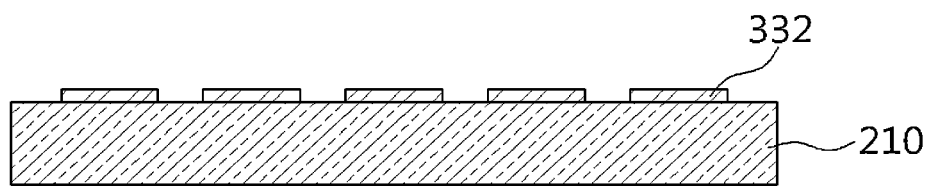
Figure 9:
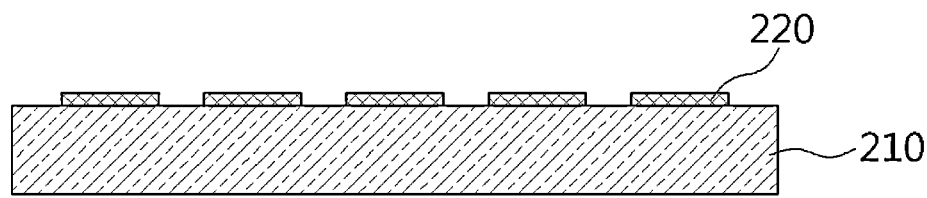

FIGS. 7 to 9 are sectional views showing an example of forming the ZnO seed layer patterned in the form of dots on the substrate.

Referring to FIG. 7, a hydrophobic self-assembled layer 320 and a Zn layer 330 are sequentially formed on a stamp 300 patterned in the form of dots. The hydrophobic self-assembled layer 320 may be omitted if necessary.

Various types of materials can be used as materials for the stamp 300 if a dot pattern 310 can be formed thereon. For instance, the stamp 300 can be formed by using glass, silicon, metal or polymer. In addition, the dot pattern 310 can be formed on the stamp 300 through the lithography process generally known in the art.

The hydrophobic self-assembled layer 320 can attenuate the bonding strength between the stamp 400 and the Zn layer 330 by adjusting surface energy of the stamp 300. The hydrophobic self-assembled layer 320 may include fluoric materials, preferably, $CF_3(CF_2)_5(CH_2)_2SiCl_3$(tridecafluoro-1,1,2,2-tetrahydrooctyltrichlorosilane).

The hydrophobic self-assembled layer 320 can be formed through the vapor deposition process or the dipping process, and the Zn layer 330 can be formed through the physical vapor deposition process or the chemical vapor deposition process.

The ZnO layer 330 is transferred onto the substrate 210 through the stamping scheme. The substrate 210 is identical to the substrate 110 according to first embodiment.

The stamping scheme is a scheme for transferring the ZnO layer 330, in detail, a part of the ZnO layer 330 located on the dot pattern 310 of the stamp 300 onto the substrate 210 by pressing the ZnO layer 330 of the stamp 300 against the substrate 210. The pressing process may be performed under the proper temperature condition such that the ZnO layer 330 can be readily transferred onto the substrate 210.

As shown in FIG. 8, a dot-pattern Zn layer 332 is formed on the substrate 210 as a result of the stamping process.

Then, the dot-pattern Zn layer 332 aligned on the substrate 210 is oxidized, thereby forming a ZnO seed layer 220 as shown in FIG. 9.

The ZnO seed layer 220 can be formed by immersing the substrate 210 formed with the ZnO layer 332 in a polar solvent containing an OH donor. The OH donor may include one of $NH_4OH$, $KOH$, $LiOH$ and $NaOH$. The ZnO layer 332 is oxidized by receiving oxygen from OH ions ($OH^-$) in the polar solvent containing the OH donor, so that the ZnO seed layer 220 can be formed.

Then, the ZnO nanorods are vertically grown from the ZnO seed layer 220 through the hydrothermal synthesis scheme. In addition, the $TiO_2$ sol is coated on the ZnO nanorods and sintered so that the nanorods having the ZnO core/$TiO_2$ shell structure can be obtained.

In addition, after the nanorods having the ZnO core/$TiO_2$ shell structure have been formed, upper end portions of the $TiO_2$ shells and the ZnO cores are etched to form the $TiO_2$ nanotubes.

In the present embodiment, the growth of the ZnO nanorods, the formation of the $TiO_2$ shells and the formation of the $TiO_2$ nanotubes through the etching process are identical to those of Embodiment 1.

As described above, the nanostructure array substrate fabricated according to Embodiments 1 and 2 may include a plurality of metal oxide nanostructures vertically aligned on the substrate while being separated from each other. At this time, as mentioned above, the metal oxide nanostructures may be nanorods having the ZnO core/$TiO_2$ shell structure or the $TiO_2$ nanotubes obtained by etching the cores and upper end portions of the shells.

The nanostructure array substrate having the above structure can be applied to various electronic devices and optical devices due to the crystalline property, vertical alignment, wide specific surface area and superior electron transportation of the nanorod array or nanotube array.

<Embodiment 3: Application of Nanostructure Array Substrate in Dye-sensitized>Solar Cell FIG. 10 is a sectional view schematically showing a dye-sensitized solar cell according to one embodiment of the present invention.

Figure 10:
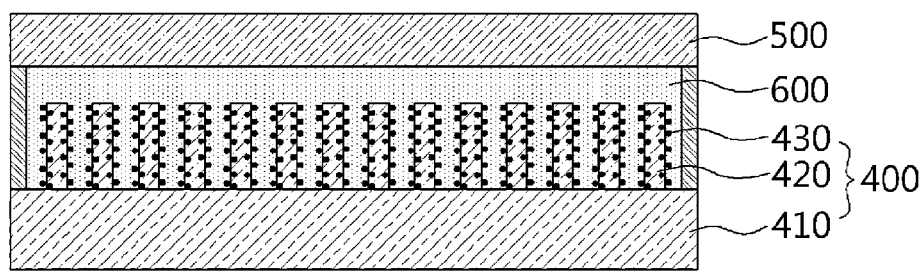
FIG. 10 is a sectional view schematically showing a dye-sensitized solar cell according to one embodiment of the present invention.

Referring to FIG. 10, the dye-sensitized solar cell includes a photo electrode 400, a counter electrode 500 opposite to the photo electrode 400, and an electrolyte 600 interposed between the photo electrode 400 and the counter electrode 500.

The photo electrode 400 includes a transparent conductive substrate 410; a plurality of metal oxide nanostructures 420 vertically aligned on the substrate 410 while being separated from each other; and a dye 430 adsorbed in the metal oxide nanostructures 420, wherein the metal oxide nanostructures 420 include nanorods having a ZnO core/$TiO_2$ shell structure or $TiO_2$ nanotubes.

The transparent conductive substrate 410 may be identical to the substrate of Embodiment 1. When the dye-sensitized solar cell is driven, the transparent conductive substrate 410 may serve as a negative electrode that receives electrons, which are generated as the dye 430 adsorbs the light, from the metal oxide nanostructures 420 to supply the electrons to an external circuit.

The dye 430 forms an electron-hole pair by adsorbing the light and includes materials generally known in the art, such as Ru-based dye, polymer dye or dye using a quantum dot.

The counter electrode 500 can be formed by coating Pt, active carbon or carbon nanotubes on the substrate of Embodiment 1. For instance, the counter electrode 500 may include an FTO substrate coated with Pt.

The electrolyte 600 includes redox species of $I^-/I_3^-$, liquid, or polymer medium. The typical electrolyte generally used in the dye-sensitized solar cell can be employed as the electrolyte 600.

In particular, after the nanostructure array substrate has been fabricated according to Embodiments 1 and 2, the photo electrode 400 can be formed by adsorbing the dye in the metal oxide nanostructures, that is, in the nanorods having the ZnO core/$TiO_2$ shell structure or the $TiO_2$ nanotubes included in the nanostructure array substrate.

Figure 11:
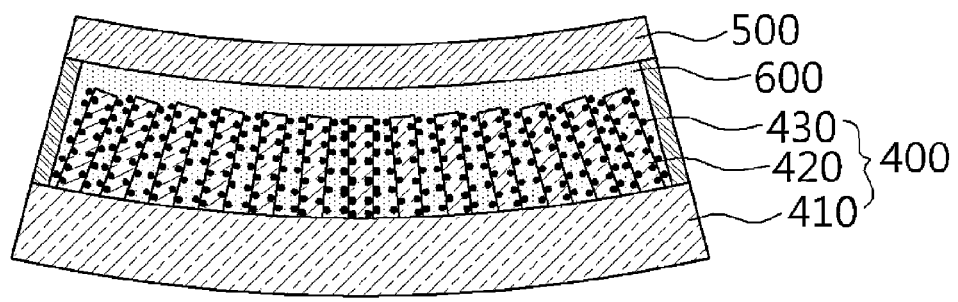
FIG. 11 is a sectional view showing a bending state of a dye-sensitized solar cell according to one embodiment of the present invention.

In the case of the dye-sensitized solar cell according to the present embodiment, the nanostructures 420 included in the photo electrode 400 are vertically aligned on the substrate 410 while being separated from each other. Thus, the transparency of the substrate 410 can be ensured. In addition, in the case that a flexible substrate, such as a plastic substrate, is used, the nanostructures 420 may not collide with each other even if the substrate 410 is bent as shown in FIG. 11, so the flexibility of the substrate 410 can be effectively ensured.

Figure 12:
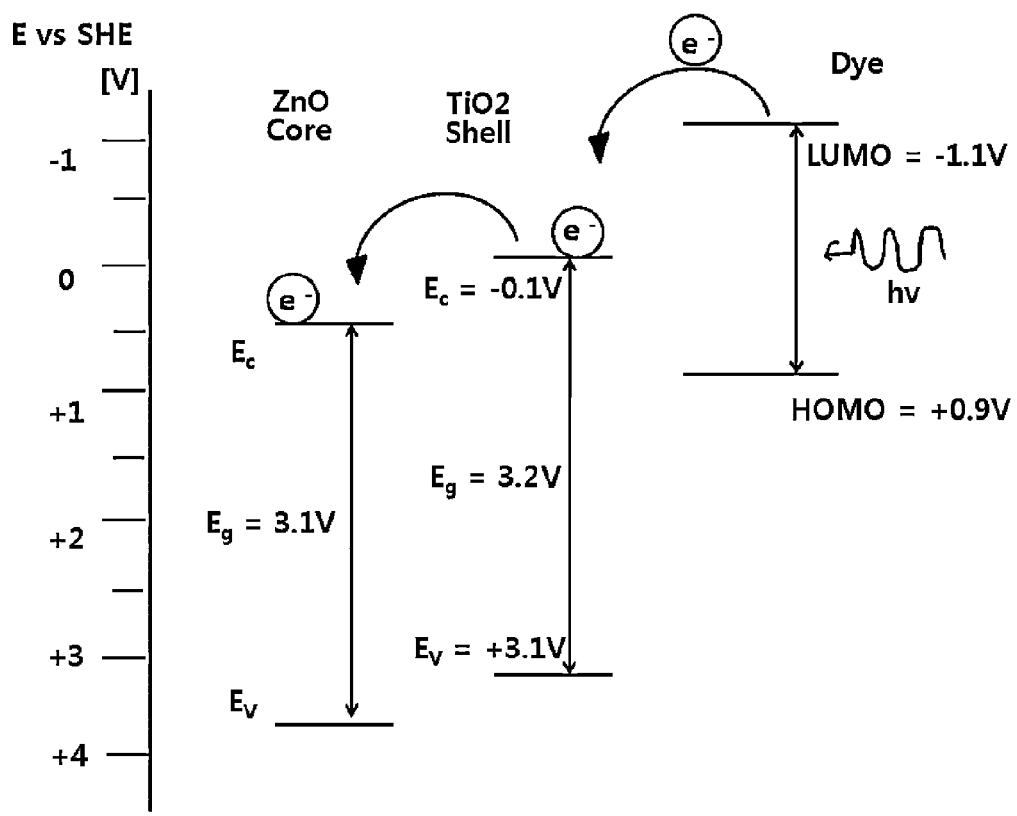
FIG. 12 is a schematic view showing a transfer route of electrons in a photo electrode of a dye-sensitized solar cell according to one embodiment of the present invention.

Further, due to the nanostructures 420 included in the photo electrode 400, high electron mobility can be obtained. That is, the movement route of the electrons can be shortened when comparing with the conventional dye-sensitized solar cell including a porous layer consisting of $TiO_2$ particles used in a photo electrode. In particular, if nanorods having the ZnO core/$TiO_2$ shell structure are used as the nanostructures 420, as shown in FIG. 12, electrons generated as the dyes adsorb the light can be easily collected in a negative electrode through conduction bands of $TiO_2$ shell and the ZnO core having the proper energy level.

In addition, if the $TiO_2$ nanotubes are used as the nanostructures 420, the dyes 430 can be adsorbed in both inner and outer peripheral surfaces of the nanotubes, so the dye adsorption can be increased.

Hereinafter, the exemplary experimental example will be described such that those skilled in the art can comprehend the present invention. However, the exemplary experimental example is illustrative purpose only and the present invention is not limited thereto.

EXPERIMENTAL EXAMPLE

1) In a rounded-bottom flask equipped with a reflux condenser, anhydrous zinc acetate and monoethanolamine (12 mmol, equimolar ratio) were dissolved in 40 ml of n-propanol for 30 minutes at the temperature of 60° C. After cooling them at the room temperature, Triton X-100 was added to zinc acetate sol at the equimolar ratio to reduce the reaction speed and to increase viscosity. After sufficiently stirring the viscose zinc acetate sol, the viscose zinc acetate sol was filtered through a 0.45 μm ADVANTEC hydrophilic PTFE (polytetrafluoroethylene) filter in order to remove pollutants and stored for one day at the room temperature to prepare a solution for forming a seed layer. Then, the solution was spin coated on a substrate and a heat treatment process was performed to form a ZnO seed layer.

2) Negative tone photoresist (AZ nLOF 2020, AZ electronic materials) was diluted in a thinner (AZ 1500 thinner, AZ electronic materials) in a volume ratio of 1:1.75, and then spin-coated on the seed layer for 40 seconds at 6000 rpm to have the thickness of 450 nm. After that, a soft-baking treatment was performed for 1 minute at the temperature of 115° C. Then, the photoresist was exposed through the laser interference lithography and a hard-baking treatment was performed for 1 minute at the temperature of 115° C. Then, non-exposure regions were removed to form periodic hole patterns in the photoresist.

3) A culture solution for ZnO nanorods was prepared by using zinc nitrate hexahydrate, hexamethylenetetramine, polyethyleneimine, and deionized water, and the culture solution was intensively stirred and ultrasonic treated. In order to prevent the overgrowth of ZnO particles, the culture solution was stored in a refrigerator at the temperature of 4° C. or below. The substrate prepared in step 2) was cultivated for 6 hours at the temperature of 92° C. by using the culture solution, thereby forming the ZnO nanorods. Then, the substrate formed with the ZnO nanorods was washed by using distilled water and baked in the atmosphere for 30 minutes at the temperature of 40° C., thereby removing several by-products and pollutants. A residual layer of the photoresist was removed through the $O_2$ plasma treatment.

4) The substrate where the ZnO nanorods were grown was immersed in 0.068 M of a sodium citrate solution to prevent surface growth of polar ZnO. Then, titanium butoxide was dispersed in anhydrous isopropyl alcohol (IPA) to prepare the $TiO_2$ sol. One droplet of the $TiO_2$ sol was dropped onto the substrate where the ZnO nanorods were grown. Then, the $TiO_2$ sol was dried at the room temperature and baked on a hot plate for 30 minutes at the temperature of 90° C. After that, the $TiO_2$ sol was sintered in an air furnace for 1 hour and 30 minutes at the temperature of 450° C. to improve the crystalline property of $TiO_2$ Then, Ar plasma was irradiated onto the substrate formed with the nanorods having the ZnO core/$TiO_2$ shell structure to remove the upper end portions of the $TiO_2$ shells. In addition, the ZnO cores were removed for 2 minutes at the room temperature by using 0.5 M of an HCl solution. After the wet etching process had been completed, the sample was sufficiently washed by using deionized water. As a result, the crystalline $TiO_2$ nanotubes vertically aligned on the substrate were prepared.

ANALYSIS EXAMPLE

Properties of the $TiO_2$ nanotubes prepared according to the above experimental example were measured by using X-ray diffraction (XRD, Cu—Kα radiation, 40 kV, 40 mA, Rigaku D/max-2400). In addition, the morphology of the $TiO_2$ nanotubes was observed by using a JEOL 2010 F FE-SEM (field emission-scanning electron microscope) employing acceleration voltage of 200 keV.

Figure 13:
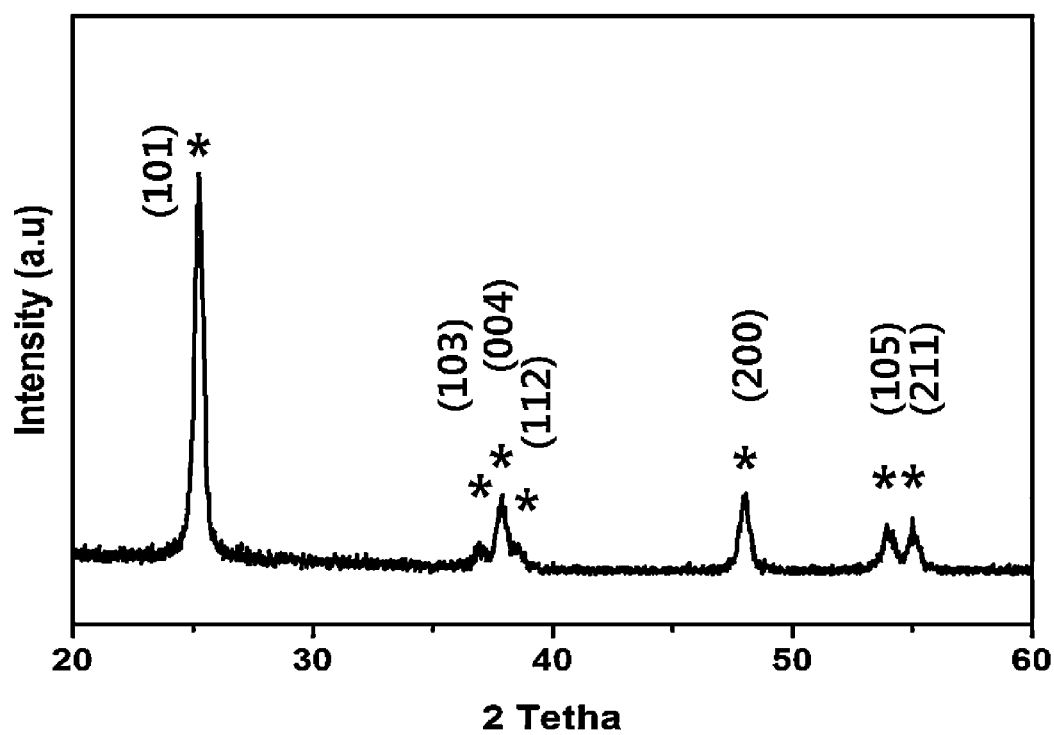
FIG. 13 is an XRD pattern of TiO$_2$ nanotubes fabricated according to an experimental example of the present invention.

FIG. 13 is an XRD pattern of the $TiO_2$ nanotubes fabricated according to the experimental example of the present invention.

Referring to FIG. 13, anatase type $TiO_2$ nanotubes are prepared according to the method of the present invention.

Figure 14A:
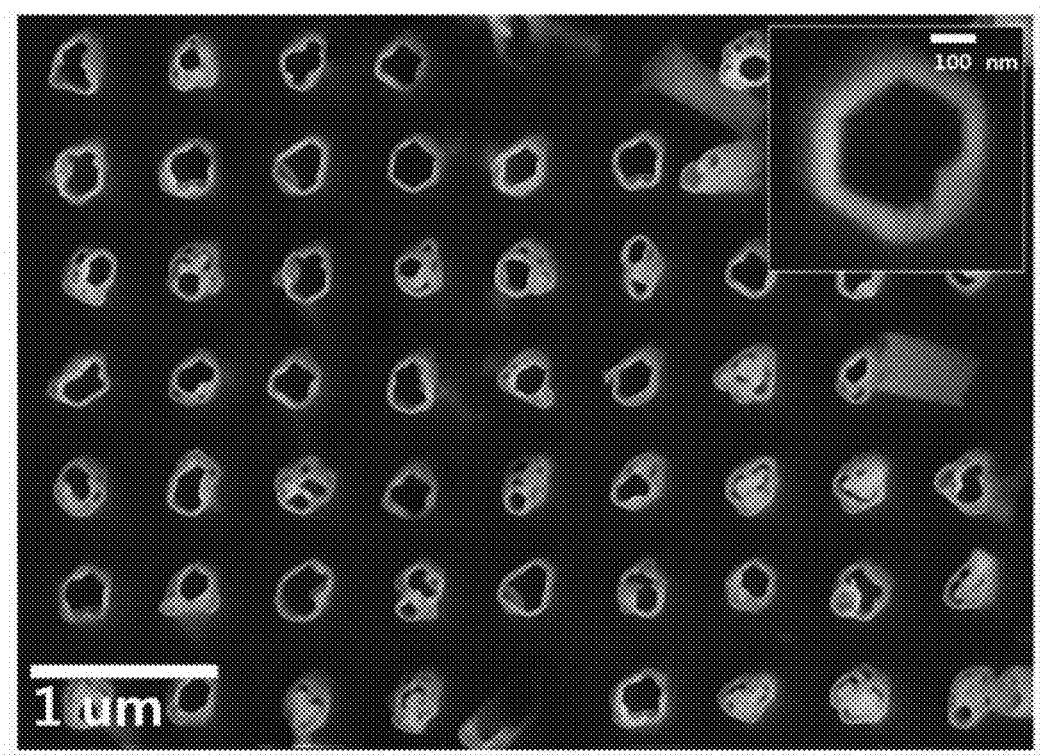
FIGS. 14a and 14b are SEM images of a TiO$_2$ nanotube array fabricated according to an experimental example of the present invention.
Figure 14B:
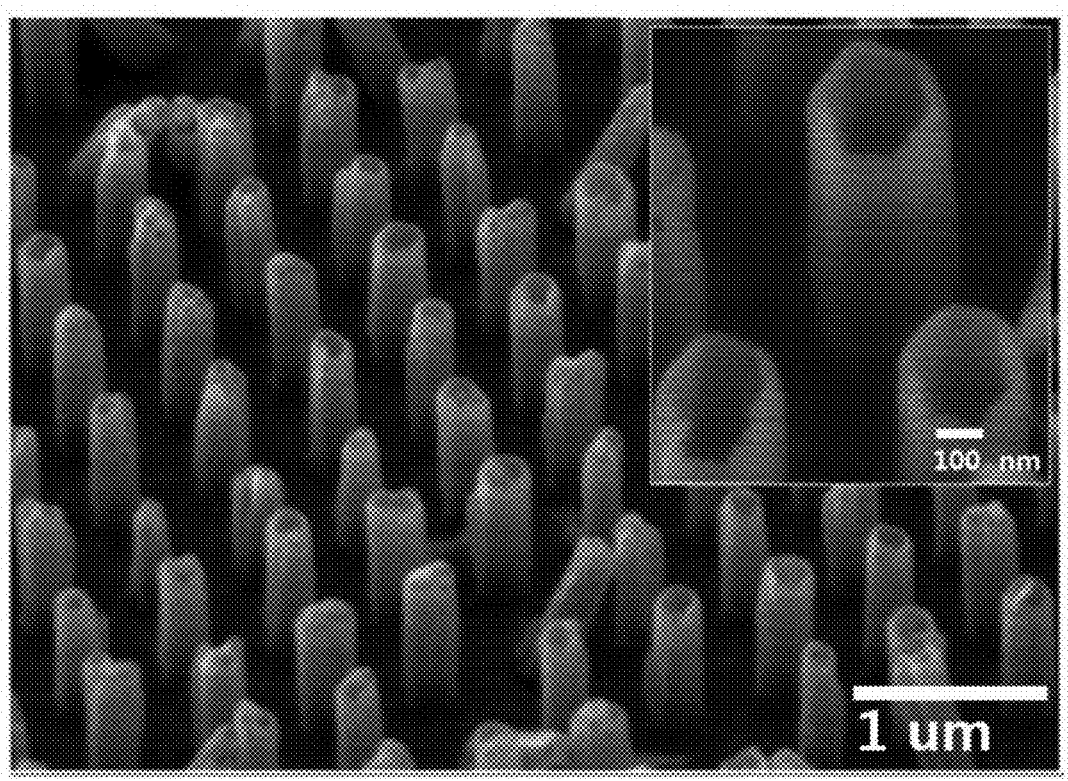

FIGS. 14a and 14b are SEM images of the $TiO_2$ nanotube array fabricated according to the experimental example of the present invention, in which FIG. 14a is a front view and FIG. 14b is a perspective view of the $TiO_2$ nanotube array. Referring to FIG. 14, the $TiO_2$ nanotubes prepared according to the method of the present invention are vertically aligned on the substrate while being separated from each other.

In addition, the $TiO_2$ nanotubes are fabricated by using the ZnO nanorods as a template, so the nanorods having the ZnO core/$TiO_2$ shell structure can be fabricated according to the method of the present invention.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for fabricating a nanostructure array substrate, the method comprising:
    forming a ZnO seed layer on a substrate;
    forming a pattern layer having a plurality of holes on the ZnO seed layer such that the ZnO seed layer is partially exposed through the pattern layer;
    forming ZnO nanorods vertically aligned from the exposed seed layer;
    removing the pattern layer;
    coating a $TiO_2$ sol on the ZnO nanorods and sintering the ZnO nanorods to form nanorods having a ZnO core/$TiO_2$ shell structure; and
    etching upper end portions of the nanorods having ZnO core/$TiO_2$ shell structure to form $TiO_2$ nanotubes.

2. The method of claim 1, wherein the forming of the ZnO seed layer is carried out by using a sol-gel method or a hydrothermal synthesis method.

3. The method of claim 1, wherein the forming of the ZnO nanorods is carried out through a hydrothermal synthesis method.

4. The method of claim 1, wherein the coating of the $TiO_2$ sol is carried out through a drop casting method.

5. The method of claim 1, further comprising capping upper end portions of the ZnO nanorods with anionic organic substances after forming the ZnO nanorods.

6. A method for fabricating a nanostructure array substrate, the method comprising:
    forming a ZnO seed layer on a substrate;
    forming a pattern layer having a plurality of holes on the ZnO seed layer such that the ZnO seed layer is partially exposed through the pattern layer;
    forming ZnO nanorods vertically aligned from the exposed seed layer;
    capping upper end portions of the ZnO nanorods with anionic organic substances;
    removing the pattern layer; and
    coating a $TiO_2$ sol on the ZnO nanorods and sintering the ZnO nanorods to form nanorods having a ZnO core/$TiO_2$ shell structure.

7. The method of claim 6, wherein the forming of the ZnO seed layer is carried out by using a sol-gel method or a hydrothermal synthesis method.

8. The method of claim 6, wherein the forming of the ZnO nanorods is carried out through a hydrothermal synthesis method.

9. The method of claim 6, wherein the coating of the $TiO_2$ sol is carried out through a drop casting method.

10. The method of claim 6, further comprising forming $TiO_2$ nanotubes by etching uppern end portions of $TiO_2$ shell and ZnO cores after forming the nanorods having the core/shell structure.

\* \* \* \* \*